United States Patent
Song et al.

(10) Patent No.: US 10,073,461 B2
(45) Date of Patent: Sep. 11, 2018

(54) DRIVERLESS VEHICLE, METHOD, APPARATUS AND SYSTEM FOR POSITIONING DRIVERLESS VEHICLE

(71) Applicant: Baidu Online Network Technology (Beijing) Co., Ltd., Beijing (CN)

(72) Inventors: Shiyu Song, Beijing (CN); Wenbo Li, Beijing (CN); Tianlei Zhang, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 15/283,018

(22) Filed: Sep. 30, 2016

(65) Prior Publication Data

US 2017/0344015 A1    Nov. 30, 2017

(30) Foreign Application Priority Data

May 24, 2016   (CN) ............................ 2016 1 0348334

(51) Int. Cl.
| | | |
|---|---|---|
| *G05D 1/00* | (2006.01) | |
| *G05D 1/02* | (2006.01) | |
| *G01S 7/48* | (2006.01) | |
| *G01S 17/89* | (2006.01) | |

(52) U.S. Cl.
CPC .......... *G05D 1/0231* (2013.01); *G01S 7/4808* (2013.01); *G01S 17/89* (2013.01); *G05D 1/0274* (2013.01); *G05D 2201/0213* (2013.01)

(58) Field of Classification Search
CPC .. G05D 1/0231; G05D 1/0274; G01S 7/4808; G01S 17/89

USPC ........................................................... 701/28
See application file for complete search history.

(56) References Cited

U.S. PATENT DOCUMENTS

| | | | | |
|---|---|---|---|---|
| 2004/0188596 | A1* | 9/2004 | Ludwig ................. | G01S 7/486 250/208.1 |
| 2005/0180662 | A1* | 8/2005 | Hoffman ................. | G01C 3/08 382/321 |

FOREIGN PATENT DOCUMENTS

| | | | |
|---|---|---|---|
| CN | 105574929 | * | 5/2017 |
| CN | 102608620 B | * | 9/2017 |

* cited by examiner

*Primary Examiner* — Muhammad Shafi
(74) *Attorney, Agent, or Firm* — Knobbe Martens Olson & Bear LLP

(57) ABSTRACT

Disclosed embodiments include a driverless vehicle, and a method, an apparatus and a system for positioning a driverless vehicle. In some embodiments, the method includes: acquiring first laser point cloud reflection value data matching a current position of the driverless vehicle; converting the first laser point cloud reflection value data into laser point cloud projection data in a horizontal earth plane; determining a first matching probability of the laser point cloud projection data in a predetermined range of a laser point cloud reflection value map by using a position of a predetermined prior positioning position in the laser point cloud reflection value map as an initial position; and determining a position of the driverless vehicle in the laser point cloud reflection value map based on the first matching probability. The implementation can accurately position the current position of the driverless vehicle.

14 Claims, 6 Drawing Sheets

DRIVERLESS VEHICLE, METHOD, APPARATUS AND SYSTEM FOR POSITIONING DRIVERLESS VEHICLE

CROSS-REFERENCE TO RELATED APPLICATIONS

This application is related to and claims priority from Chinese Application No. 201610348334.7, filed on May 24, 2016, entitled "DRIVERLESS VEHICLE, METHOD, APPARATUS AND SYSTEM FOR POSITIONING DRIVERLESS VEHICLE", the entire disclosure of which is hereby incorporated by reference.

TECHNICAL FIELD

The present application relates to the field of vehicle engineering technology, specifically to the field of driverless vehicles, and more specifically, to a driverless vehicle, and a method, an apparatus and a system for positioning a driverless vehicle.

BACKGROUND

An unmanned vehicle (hereinafter referred to as a driverless vehicle) is a modern vehicle that can, without manual control, sense surrounding environment and make situational decisions to perform control.

A positioning system plays a pivotal role during automatic drive of the driverless vehicle. Other modules, such as a sensing module and a route planning module, perform corresponding operations, to various degrees, based on positioning results generated by the positioning system. The positioning accuracy is one of the key factors directly affecting the success of a driverless vehicle.

In the prior art, Real-time kinematic (RTK) positioning in a Global Positioning System (GPS) is mainly used to determine the position of a driverless vehicle.

However, when a GPS satellite signal is blocked or the multi-path effect in a complicated environment is prominent, the RTK positioning method in the prior art will generate big positioning errors, and cannot provide a highly precise and stable positioning result.

SUMMARY

An objective of some embodiments of the present application is to provide an improved driverless vehicle and an improved method, apparatus and system for positioning a driverless vehicle, in order to solve the technical problem mentioned in the foregoing Background section In the first aspect, some embodiments of the present application provide a method for positioning a driverless vehicle based on laser point cloud reflection value matching, comprising: acquiring first laser point cloud reflection value data matching a current position of the driverless vehicle, the first laser point cloud reflection value data comprising first coordinates of laser points and laser reflection intensity values corresponding to the laser points in the first laser point cloud reflection value data; converting the first laser point cloud reflection value data into laser point cloud projection data in a horizontal earth plane; determining a first matching probability of the laser point cloud projection data in a predetermined range of a laser point cloud reflection value map by using a position of a predetermined prior positioning position in the laser point cloud reflection value map as an initial position; and determining a position of the driverless vehicle in the laser point cloud reflection value map based on the first matching probability.

In the second aspect, some embodiments of the present application provide an apparatus for positioning a driverless vehicle based on laser point cloud reflection value matching, comprising: an acquisition module, configured to acquire first laser point cloud reflection value data matching a current position of the driverless vehicle, the first laser point cloud reflection value data comprising first coordinates of laser points and laser reflection intensity values corresponding to the laser points in the first laser point cloud reflection value data; a conversion module, configured to convert the first laser point cloud reflection value data into laser point cloud projection data in a horizontal earth plane; a matching probability determination module, configured to determine a first matching probability of the laser point cloud projection data in a predetermined range of a laser point cloud reflection value map by using a position of a predetermined prior positioning position in the laser point cloud reflection value map as an initial position; and a position determination module, configured to determine a position of the driverless vehicle in the laser point cloud reflection value map based on the first matching probability.

In the third aspect, some embodiments of the present application provide a driverless vehicle, comprising: a point cloud reflection value data collection apparatus, configured to collect laser point cloud reflection value data of a current position of the driverless vehicle, the laser point cloud reflection value data comprising coordinates of laser points and laser reflection intensity values corresponding to the laser points; a storage apparatus, configured to store a laser point cloud reflection value map; and a processor, configured to project the laser point cloud reflection value data to a horizontal earth plane to generate laser point cloud projection data; determine a first matching probability of the laser point cloud projection data in a predetermined range of the laser point cloud reflection value map by using a position of a predetermined prior positioning position in the laser point cloud reflection value map as an initial position; and determine a position of the driverless vehicle in the laser point cloud reflection value map based on the first matching probability.

In the fourth aspect, some embodiments of the present application provide a system for positioning a driverless vehicle, comprising a driverless vehicle and a positioning server, wherein the driverless vehicle a point cloud reflection value data collection apparatus and a first communication apparatus; the point cloud reflection value data collection apparatus is configured to collect laser point cloud reflection value data of a current position of the driverless vehicle, the laser point cloud reflection value data comprising first coordinates of laser points and laser reflection intensity values corresponding to the laser points; the first communication apparatus is configured to send the laser point cloud reflection value data to the positioning server; the positioning server comprises a second communication apparatus, a memory, and a processor; the second communication apparatus is configured to receive the laser point cloud reflection value data sent by the first communication apparatus; the memory is configured to store a laser point cloud reflection value map; the processor is configured to project the laser point cloud reflection value data to a horizontal earth plane to generate laser point cloud projection data, determine a first matching probability of the laser point cloud projection data in a predetermined area of the laser point cloud reflection value map by using a position of a predetermined prior positioning position in the laser point cloud reflection value map as an initial position, and determine a positioning result of the driverless vehicle based on the first matching probability, the positioning result comprising position information of the driverless vehicle in the laser point cloud reflection value map; and the second communication apparatus is further configured to send the positioning result to the first communication apparatus.

In the driverless vehicle, the method, apparatus and system for positioning a driverless vehicle provided in some embodiments of the present application, by converting the first laser point cloud reflection value data matching the current position of the driverless vehicle into the laser point cloud projection data and matching the laser point cloud projection data with areas in a predetermined range of the laser point cloud reflection value map, the position of the driverless vehicle in the laser point cloud reflection value map is determined based on the matching probability, thereby implementing accurate positioning on the current position of the driverless vehicle, and avoiding the defect in the prior art that the GPS-based RTK positioning has large errors due to a blocked GPS satellite signal or an intense multi-path effect of a complicated environment.

BRIEF DESCRIPTION OF THE DRAWINGS

Other features, objectives and advantages of the present application will become more apparent upon reading the detailed description to non-limiting embodiments with reference to the accompanying drawings, wherein.

DETAILED DESCRIPTION

The present application will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
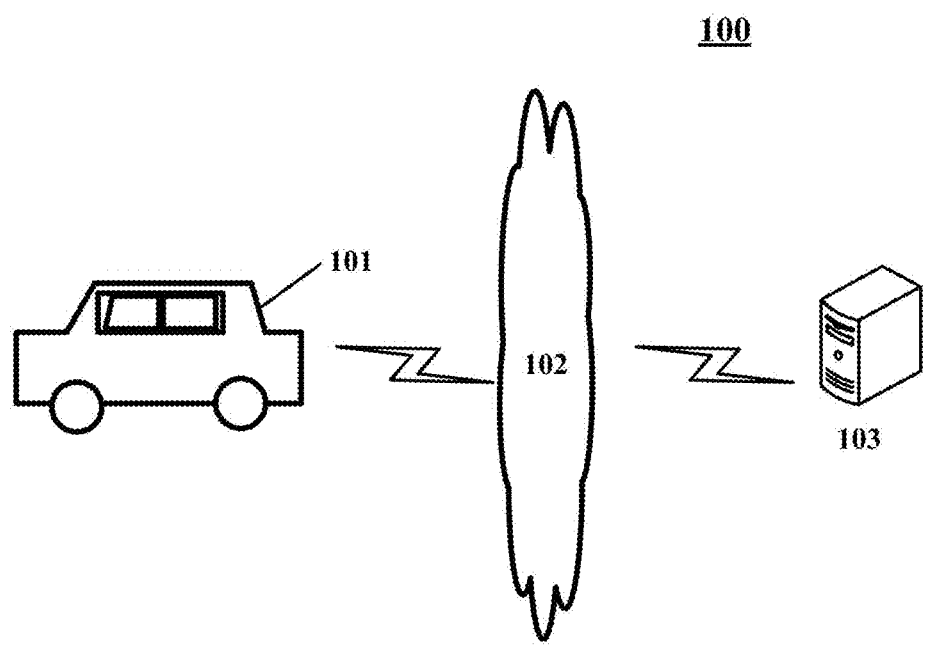
FIG. 1 is an architectural diagram of a system in which some embodiments of the present application may be implemented.

FIG. 1 shows a system architecture 100 in which an embodiment of a method for positioning a driverless vehicle based on laser point cloud reflection value matching or an apparatus for positioning a driverless vehicle based on laser point cloud reflection value matching of some embodiments of the present application may be implemented.

As shown in FIG. 1, the system architecture 100 may comprise a driverless vehicle 101, a network 102 and a server 103. The network 102 serves as a medium providing a communication link between the driverless vehicle 101 and the server 103. The network 102 may include various types of connections, such as wired or wireless transmission links, or optical fibers.

The driverless vehicle 101 may interact with the server 103 through the network 102, in order to transmit or receive messages, etc. The driverless vehicle 101 may be mounted with a laser point cloud collection apparatus, a communication apparatus, a processor, and the like.

The server 103 may be a server providing various services, for example, a server processing laser point cloud reflection value data collected by the driverless vehicle 101. The server 103 may process, for example, analyze, the received laser point cloud reflection value data, and return a processing result (for example, positioning information of the driverless vehicle) to the driverless vehicle 101.

It should be noted that, the method for positioning a driverless vehicle based on laser point cloud reflection value matching provided in the embodiment of the present application may be executed by the driverless vehicle 101, or may be executed by the server 103, or a part of steps of the method are executed by the driverless vehicle 101 and the other part of steps are executed by the server 103. Correspondingly, the apparatus for positioning a driverless vehicle based on laser point cloud reflection value matching may be disposed in the server 103, or disposed in the driverless vehicle 101, or a part of modules of the apparatus are disposed in the server 103 and the other part of modules are disposed in the driverless vehicle 101.

It should be appreciated that the numbers of the driverless vehicle 101, the network 102 and the server 103 in FIG. 1 are merely illustrative. Any number of driverless vehicles 101, networks 102 and servers 103 may be provided based on the actual requirements.

Figure 2:
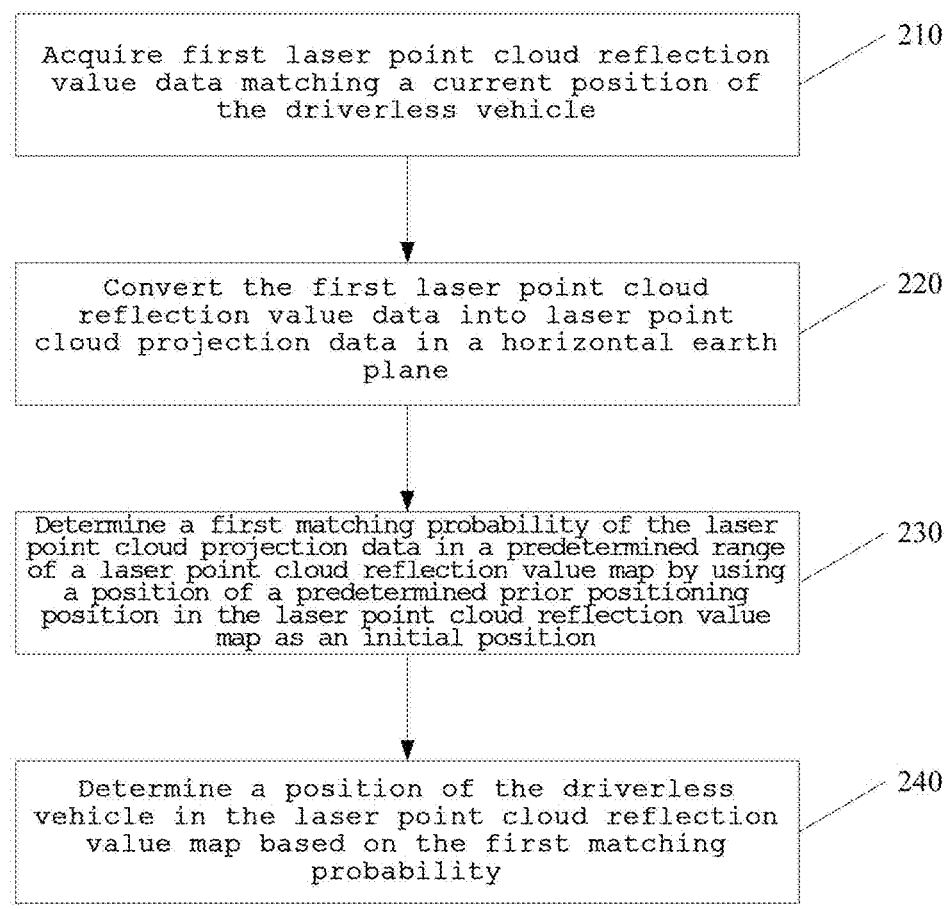
FIG. 2 is a flow chart of an embodiment of a method for positioning a driverless vehicle based on laser point cloud reflection value matching according to the present application.

Continuously referring to FIG. 2, a process 200 of an embodiment of a method for positioning a driverless vehicle based on laser point cloud reflection value matching according to some embodiments of the present application is shown. The method for positioning a driverless vehicle based on laser point cloud reflection value matching comprises the following steps:

Step 210, acquiring first laser point cloud reflection value data matching a current position of the driverless vehicle. The first laser point cloud reflection value data comprises first coordinates of laser points and laser reflection intensity values corresponding to the laser points in the first laser point cloud reflection value data.

A reflection value of a laser point cloud is the reflection intensity of the laser point after irradiating an object, and a numerical range thereof may be, for example, 0~255.

In some alternative implementations, if an apparatus on which the method for positioning a driverless vehicle based on laser point cloud reflection value matching in this embodiment is applied is the driverless vehicle in FIG. 1, the laser point cloud reflection value collection apparatus disposed on the driverless vehicle may be used to collect first laser point cloud reflection value data of the current position of the driverless vehicle.

Alternatively, in some other alternative implementations, if an apparatus on which the method for positioning a driverless vehicle based on laser point cloud reflection value matching in this embodiment is applied is the server in FIG. 1, the laser point cloud reflection value collection apparatus disposed on the driverless vehicle may be used to collect first laser point cloud reflection value data of the current position of the driverless vehicle, and upload the data to the server in a wired or wireless connection manner, thereby implementing acquisition of the first laser point cloud reflection value data. It should be noted that, the wireless connection manner may comprise, but not limited to, 3G/4G connection, WiFi connection, Bluetooth connection, WiMAX connection, Zigbee connection, UWB (ultra wideband) connection, and other wireless connection manners that are known or will be developed in the future.

Step 220, converting the first laser point cloud reflection value data into laser point cloud projection data in a horizontal earth plane.

By projecting the first laser point cloud reflection value data to the horizontal earth plane, laser point cloud reflection values of coordinate positions in a three-dimensional space acquired in the step 210 may be converted into laser point cloud reflection values of coordinate positions in the horizontal earth plane.

Step 230, determining a first matching probability of the laser point cloud projection data in a predetermined range of a laser point cloud reflection value map by using a position of a predetermined prior positioning position in the laser point cloud reflection value map as an initial position.

Here, the prior positioning position may be a current position of the driverless vehicle determined using another positioning method, or may also be a current position of the driverless vehicle obtained through prediction by a prediction algorithm.

The prior positioning position may be "corrected" by determining first matching probabilities of the laser point cloud projection data with various areas in a predetermined range comprising the prior positioning position in the laser point cloud reflection value map, such that a finally determined positioning result of the driverless vehicle has less errors.

Step 240, determining a position of the driverless vehicle in the laser point cloud reflection value map based on the first matching probability.

For example, if a first matching probability between the laser point cloud projection data and an area in the predetermined range of the laser point cloud reflection value map may be higher than first matching probabilities between the laser point cloud projection data and other areas in the predetermined range of the laser point cloud reflection value map, in some alternative implementations, the area having the higher first matching probability may be used as the position of the driverless vehicle currently in the laser point cloud reflection value map.

Alternatively, in some other alternative implementations, the first matching probabilities of the laser point cloud projection data and the areas in the predetermined range of the laser point cloud reflection value map may be processed, and the position of the driverless vehicle currently in the laser point cloud reflection value map may be further determined from a processing result.

In the method for positioning a driverless vehicle based on laser point cloud reflection value matching of this embodiment, by converting the first laser point cloud reflection value data matching the current position of the driverless vehicle into the laser point cloud projection data and matching the laser point cloud projection data with areas in a predetermined range of the laser point cloud reflection value map, the position of the driverless vehicle in the laser point cloud reflection value map is determined based on the matching probability, thereby correcting the prior positioning position, and further implementing precise positioning on the driverless vehicle.

Figure 3:
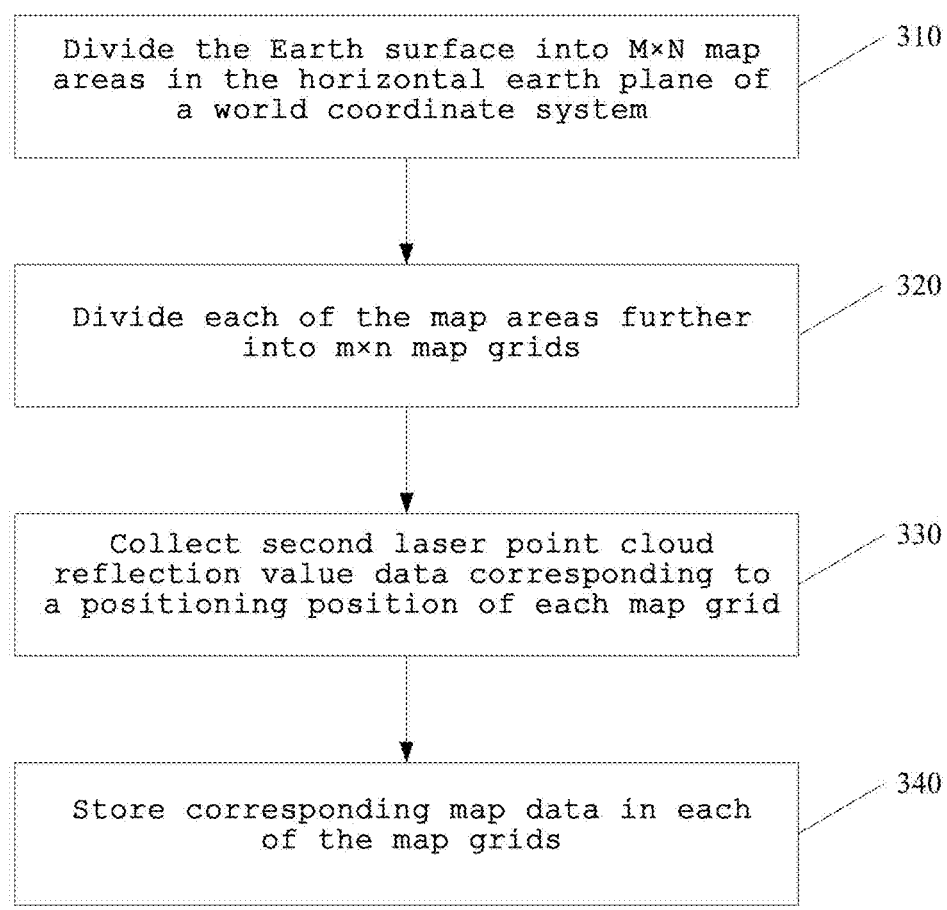
FIG. 3 is a schematic flow chart of generating a laser point cloud reflection value map in the method for positioning a driverless vehicle based on laser point cloud reflection value matching according to some embodiments of the present application.

In some alternative implementations, the laser point cloud reflection value map in the method for positioning a driverless vehicle based on laser point cloud reflection value matching of this embodiment may be generated by a process 300 shown in FIG. 3.

Specifically, step 310, dividing the Earth surface into M×N map areas in the horizontal earth plane of the world coordinate system, wherein the map areas may, for example, have identical sizes and shapes.

In some alternative implementations, for example, the world coordinate system may adopt a Universal Transverse Mercator (UTM) coordinate system.

Step 320, dividing each of the map areas further into m×n map grids, the map grids having identical sizes and shapes.

Since the map areas obtained by the division in step 310 may cover a large area range, in the process of generating the laser point cloud reflection value map, the number of laser points in each map area may have a fairly large order of magnitudes, causing a large amount of computation of the positioning processing. Moreover, when the map area may cover a large area range, the precision of a positioning result obtained based on the map is low. Therefore, in this step 320, each map area may be further divided, thereby reducing the amount of computation of the positioning processing, and improving the positioning precision of the positioning result.

Step 330, collecting second laser point cloud reflection value data corresponding to a positioning position of each map grid, the second laser point cloud reflection value data comprising second coordinates of laser points in the world coordinate system and laser reflection intensity values corresponding to the laser points in the second laser point cloud reflection value data.

For example, it is assumed that an abscissa of a map grid is $x \in [x_a, x_b]$, and an ordinate of the map grid is $y \in [y_c, y_d]$. In this step, laser reflection intensity values of laser points whose world coordinates are located in the range may be collected, and laser reflection intensity values of laser points in coordinate ranges of the map grids on the Earth surface may be collected in a similar manner.

Step 340, storing corresponding map data in each of the map grids. The map data comprises an average of laser reflection intensity values of laser points in the positioning position corresponding to the map grid, a variance of the laser reflection intensity values of the laser points in the positioning position corresponding to the map grid, and the number of the laser points in the positioning position corresponding to the map grid.

Referring to FIG. 2 again, in some alternative implementations, in the step 210 of FIG. 2, the first coordinate of the laser point may be a coordinate of each laser point in the first laser point cloud reflection value data in a vehicle coordinate system of the driverless vehicle.

In the alternative implementations, the converting the first laser point cloud reflection value data into laser point cloud projection data in a horizontal earth plane in step 220 in FIG. 2 may further comprise:

Step 221, converting the first laser point cloud reflection value data into third laser point cloud reflection value data on.

Here, the third laser point cloud reflection value data may, for example, comprise third coordinates of laser points and laser reflection intensity values corresponding to the laser points in the first laser point cloud reflection value data, and wherein the third coordinate is a coordinate of each laser point in the first laser point cloud reflection value data in the world coordinate system. The third coordinate X' may be:

$$X'=(x',y',z')^T=RX+T \qquad (1)$$

wherein R is a rotation matrix for transformation from the vehicle coordinate system of the driverless vehicle to the world coordinate system, $X=(x, y, z)^T$ is the first coordinate of each laser point in the first laser point cloud reflection value data, and T is a translation matrix for transformation from the vehicle coordinate system of the driverless vehicle to the world coordinate system.

Step 222, projecting the third laser point cloud reflection value data to the horizontal earth plane to generate the laser point cloud projection data.

The laser point cloud projection data may comprise projection coordinates of the laser points in the first laser point cloud reflection value data, an average of laser reflection intensity values of laser points in projection grids, a variance of the laser reflection intensity values of the laser points in the projection grids, and the number of the laser points in the projection grids.

The projection coordinate X" of each laser point in the first laser point cloud reflection value data meets:

$$X''=(x'',y'')^T=SX' \qquad (2)$$

wherein S is a projection matrix, and meets:

$$S = \begin{bmatrix} 1 & 0 & 0 \\ 0 & 1 & 0 \end{bmatrix}.$$

By means of the formula (1) and the formula (2), the laser point cloud data (that is, the first laser point cloud reflection value data) in the three-dimensional space collected based on the vehicle coordinate system of the driverless vehicle may be converted into the laser point cloud data (that is, the laser point cloud projection data) in the horizontal earth plane based on the world coordinate system.

Here, each of the projection grids has a size and a shape identical to a size and a shape of the map grid, for example, the projection grid and the map grid may be congruent rectangles.

In some alternative implementations, the step 230 in FIG. 2 may be further implemented through the following process.

Step 231, overlapping a center projection grid O(x, y) of the laser point cloud projection data with a map grid corresponding to the prior positioning position O' $(x_o, y_o)$ in the laser point cloud reflection value map, wherein the center projection grid O(x, y) is a projection grid representing a vehicle body of the driverless vehicle in the laser point cloud projection data.

In some application scenarios, the laser point cloud reflection value collection apparatus mounted on the driverless vehicle may collect laser point cloud reflection value data around the driverless vehicle in a predetermined radius. The laser point cloud reflection value data collected by the laser point cloud reflection value collection apparatus is located in a sphere with the driverless vehicle as a center and the predetermined radius as the radius. In these application scenarios, a part of data in the sphere may be intercepted for subsequent matching and positioning. For example, a cuboid or a cube of the sphere is constructed, and laser point cloud reflection values of laser points falling in the cuboid or cube are used as laser point cloud reflection value data (that is, the first laser point cloud reflection value data) used for positioning. Therefore, in these application scenarios, in the finally generated laser point cloud projection data, a center projection grid O(x, y) representing the driverless vehicle just falls in the geometric center of the whole projection range.

Step 232, determining a first matching probability between a projection range of the laser point cloud projection data and a corresponding map range.

It is assumed that the projection rage formed by the laser point cloud projection data comprises 5×5 projection grids, then a map range corresponding to the projection range also comprises 5×5 map grids.

In some application scenarios, a first matching probability between the projection range and the corresponding map range may be determined by, for example, the following formula (3):

$$P(x, y) = \alpha \frac{\sum_{x_i=x_1}^{x_m} \sum_{y_j=y_1}^{y_n} \frac{|\mu_{x_i,y_j}^m - \mu_{x_i,y_j}^r|(\sigma_{x_i,y_j}^m + \sigma_{x_i,y_j}^r) N_{x_i,y_j}^r}{2\sigma_{x_i,y_j}^m \sigma_{x_i,y_j}^r}}{\sum_{x_i=x_1}^{x_m} \sum_{y_j=y_1}^{y_n} N_{x_i,y_j}^r} \qquad (3)$$

wherein, (x, y) is a world coordinate of the center projection grid, $(x_i, y_j)$ is a world coordinate of each projection grid in the projection range of the laser point cloud projection data, α is a preset constant parameter, $\mu_{x_i,y_j}^m$ is an average of laser reflection intensity values of laser points in the map grid whose world coordinate is $(x_i, y_j)$, $\mu_{x_i,y_j}^r$ is an average of laser reflection intensity values of laser points in the projection grid whose world coordinate is $(x_i, y_j)$, $\sigma_{x_i,y_j}^m$ is a variance of laser reflection intensity values of laser points in the map grid whose world coordinate is $(x_i, y_j)$, $\sigma_{x_i,y_j}^r$ is a variance of laser reflection intensity values of laser points in the projection grid whose world coordinate is $(x_i, y_j)$, and $N_{x_i,y_j}^r$ is the number of laser points in the projection grid whose world coordinate is $(x_i, y_j)$. $x_1$ is an abscissa value of a map grid having the minimum abscissa in the map range, and $x_m$ is an abscissa value of a map grid having the maximum abscissa in the map range. Correspondingly, $y_1$ is an ordinate value of the map grid having the minimum ordinate n the map range, and $y_n$ is an ordinate value of the map grid having the maximum ordinate in the map range.

In other words, in the formula (3), P(x, y) is a power function with α as the base number, and $$-\frac{\sum_{x_i=x_1}^{x_m}\sum_{y_j=y_1}^{y_n}\frac{|\mu_{x_i,y_j}^m - \mu_{x_i,y_j}^r|(\sigma_{x_i,y_j}^m + \sigma_{x_i,y_j}^r)N_{x_i,y_j}^r}{2\sigma_{x_i,y_j}^m \sigma_{x_i,y_j}^r}}{\sum_{x_i=x_1}^{x_m}\sum_{y_j=y_1}^{y_n} N_{x_i,y_j}^r}$$

as the power.

Step 233, moving the center projection grid O(x, y) by a predetermined offset k, and respectively determining first matching probabilities of the laser point cloud projection data corresponding to a current center projection grid O(x, y).

Figure 4:
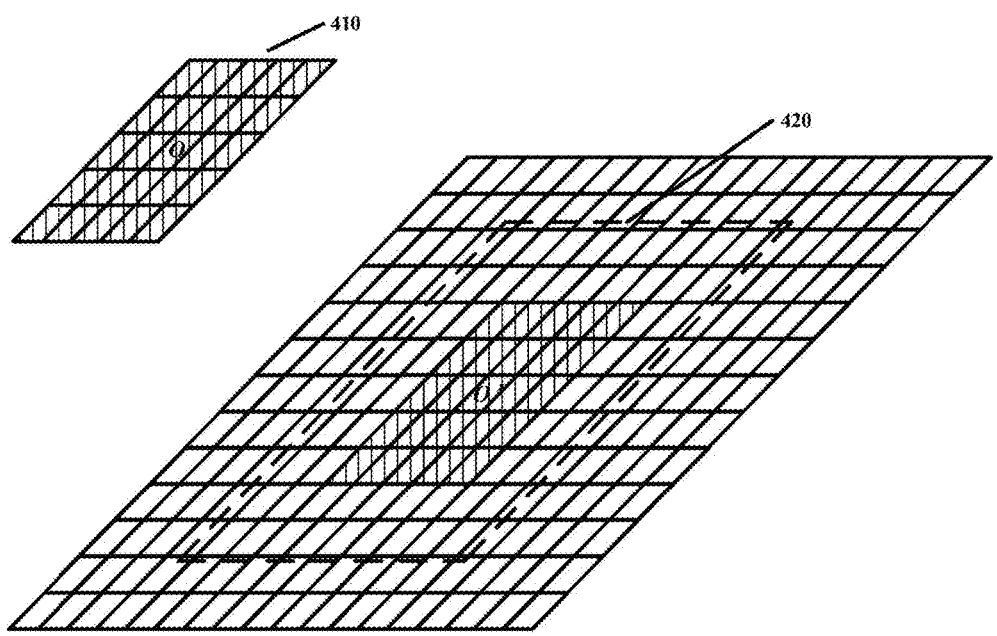
FIG. 4 is a schematic diagram of laser point cloud projection data moving in a predetermined range of the laser point cloud reflection value map in the method for positioning a driverless vehicle based on laser point cloud reflection value matching according to some embodiments of the present application.

Here, k may be considered as $(2k+1)^2$ map ranges formed by sequentially translating 1~k map grids respectively along the positive direction and the negative direction of the x axis and translating 1~k map grids respectively along the positive direction and the negative direction of the y axis from the map grid corresponding to the prior positioning position O' ($x_o$, $y_o$) as an initial position. As shown in FIG. 4, an area shown by a dashed box 420 is a predetermined range formed in the map when a projection range 410 formed by the laser point cloud projection data comprises 5×5 projection grids and an offset is k=2.

When the projection range moves in the predetermined range, first matching probabilities of the laser point cloud projection data corresponding to the current center projection grid O(x, y) may be determined respectively based on the formula (3). In other words, the first matching probabilities between the projection range and the corresponding map range are determined respectively. Taking FIG. 4 as an example, when the projection range 410 moves in the predetermined range 420, $(2k+1)^2=25$ first matching probabilities may be obtained correspondingly.

In these alternative implementations, the step 240 in FIG. 2 may further comprise:

Step 241, determining a position of the driverless vehicle in the laser point cloud reflection value map based on a weighted average of the first matching probabilities.

Specifically, for example, the position ($\bar{x}, \bar{y}$) of the driverless vehicle in the laser point cloud reflection value map may be determined by using the following formula (4):

$$\begin{cases} \bar{x} = \dfrac{\sum_{i=-k}^{k}\sum_{j=-k}^{k} P'(x_0+i, y_0+j)^\alpha \cdot (x_0+i)}{\sum_{i=-k}^{k}\sum_{j=-k}^{k} P'(x_0+i, y_0+j)^\alpha} \\ \bar{y} = \dfrac{\sum_{i=-k}^{k}\sum_{j=-k}^{k} P'(x_0+i, y_0+j)^\alpha \cdot (y_0+j)}{\sum_{i=-k}^{k}\sum_{j=-k}^{k} P'(x_0+i, y_0+j)^\alpha} \end{cases} \quad (4)$$

wherein, ($x_0$, $y_0$) is a world coordinate of a map grid where the prior positioning position is located, and P($x_0+i$, $y_0+j$) is a first matching probability between the projection range and the corresponding map range when the center projection grid is located at the coordinate ($x_0+i$, $y_0+j$) in the map.

Moreover, in some alternative implementations, after the first matching probability P of the laser point cloud projection data in the predetermined range of the laser point cloud reflection value map is determined through the formula (3), an updated first matching probability p' may be further obtained by updating the first matching probability P through the following formula (5):

$$P'(x,y) = \eta P(x,y)\overline{P}(x,y) \quad (5)$$

wherein, $\overline{P}$ (x, y) is a prediction probability of the driverless vehicle currently presenting at the position of the world coordinate (x, y) based on the previous positioning position, and η is a preset normalization coefficient.

In these alternative implementations, the first matching probability is updated, and correspondingly, the formula (4) may be transformed into the following formula (6):

$$\begin{cases} \bar{x} = \dfrac{\sum_{i=-k}^{k}\sum_{j=-k}^{k} P'(x_0+i, y_0+j)^\alpha \cdot (x+i)}{\sum_{i=-k}^{k}\sum_{j=-k}^{k} P'(x_0+i, y_0+j)^\alpha} \\ \bar{y} = \dfrac{\sum_{i=-k}^{k}\sum_{j=-k}^{k} P'(x_0+i, y_0+j)^\alpha \cdot (y_0+j)}{\sum_{i=-k}^{k}\sum_{j=-k}^{k} P'(x_0+i, y_0+j)^\alpha} \end{cases} \quad (6)$$

wherein, P'($x_0+i$, $y_0+j$) is a first matching probability between the projection range and the corresponding map range updated through the formula (5) when the center projection grid is located at the coordinate ($x_0+i$, $y_0+j$) in the map.

In some alternative implementations, in the method for positioning a driverless vehicle based on laser point cloud reflection value matching of this embodiment, the determining the position of the driverless vehicle in the laser point cloud reflection value map based on the first matching probability in step 240 may be implemented by using the following process:

Step 242, further dividing the map grids in the predetermined range, so that each of the map grids is formed into p×q sub-grids.

Step 243, determining the position ($\bar{x}, \bar{y}$) of the driverless vehicle in the laser point cloud reflection value map may be determined by using the following formula (7):

$$\begin{cases} \bar{x} = \dfrac{\sum_{x=x_o-k}^{x_o+k}\sum_{y=y_o-k}^{y_o+k} \eta(x)P''(x,y)^\alpha \cdot x}{\sum_{x=x_o-k}^{x_o+k}\sum_{y=y_o-k}^{y_o+k} \eta(x)P''(x,y)^\alpha} \\ \bar{y} = \dfrac{\sum_{x=x_o-k}^{x_o+k}\sum_{y=y_o-k}^{y_o+k} \eta(y)P''(x,y)^\alpha \cdot y}{\sum_{x=x_o-k}^{x_o+k}\sum_{y=y_o-k}^{y_o+k} \eta(y)P''(x,y)^\alpha} \end{cases} \quad (7)$$

wherein:

($x_0$, $y_0$) is a world coordinate of a map grid where the prior positioning position is located, a step length of x variable in the range [$x_o-k$, $x_o+k$] is $$\frac{1}{p},$$

and a step length of y variable in the range $[y_o-k, y_o+k]$ is $$\frac{1}{q};$$

$$\begin{cases} \eta(x) = \frac{1}{(x-x_o)^\beta} \\ \eta(y) = \frac{1}{(y-y_o)^\beta} \end{cases};$$

and

β is a preset constant parameter, and P"(x, y) is a probability obtained by conducting bilinear interpolation on the first matching probability when the map grid where (x, y) is located is used as the center projection grid. Here, the first matching probability may be the first matching probability determined through the formula (3), or the first matching probability may also be the first matching probability updated through the formula (5).

Figure 5:
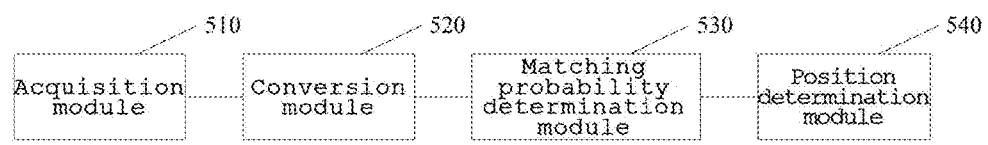
FIG. 5 is a schematic structural diagram of an embodiment of an apparatus for positioning a driverless vehicle based on laser point cloud reflection value matching according to the present application.

Further referring to FIG. 5, as an implementation of the methods shown in the above figures, some embodiments of the present application provide an embodiment of an apparatus for positioning a driverless vehicle based on laser point cloud reflection value matching. The apparatus embodiment is corresponding to the method embodiment shown in FIG. 2.

As shown in FIG. 5, the apparatus for positioning a driverless vehicle based on laser point cloud reflection value matching in this embodiment may comprise an acquisition module 510, a conversion module 520, a matching probability determination module 530 and a position determination module 540.

The acquisition module 510 may be configured to acquire first laser point cloud reflection value data matching a current position of the driverless vehicle, the first laser point cloud reflection value data comprising first coordinates of laser points and laser reflection intensity values corresponding to the laser points in the first laser point cloud reflection value data.

The conversion module 520 may be configured to convert the first laser point cloud reflection value data into laser point cloud projection data in a horizontal earth plane.

The matching probability determination module 530 may be configured to determine a first matching probability of the laser point cloud projection data in a predetermined range of a laser point cloud reflection value map by using a position of a predetermined prior positioning position in the laser point cloud reflection value map as an initial position.

The position determination module 540 may be configured to determine a position of the driverless vehicle in the laser point cloud reflection value map based on the first matching probability.

In some alternative implementations, the laser point cloud reflection value map may, for example, comprise dividing the Earth surface into M×N map areas in the horizontal earth plane of the world coordinate system, the map areas having identical sizes and shapes. Each of the map areas may further comprise m×n map grids, the map grids having identical sizes and shapes. The laser point cloud reflection value map may further comprise an average of laser reflection intensity values of laser points in the positioning position corresponding to the map grid, a variance of the laser reflection intensity values of the laser points in the positioning position corresponding to the map grid, and the number of the laser points in the positioning position corresponding to the map grid.

In some alternative implementations, the first coordinate of each of the laser points may be a coordinate of each laser point in the first laser point cloud reflection value data in a vehicle coordinate system of the driverless vehicle.

The conversion module 520 may be further configured to convert the first laser point cloud reflection value data into third laser point cloud reflection value data, project the third laser point cloud reflection value data to the horizontal earth plane, to generate laser point cloud projection data. The third laser point cloud reflection value data comprises third coordinates of laser points and laser reflection intensity values corresponding to the laser points in the first laser point cloud reflection value data, wherein the third coordinate is a coordinate of a laser point in the first laser point cloud reflection value data in the world coordinate system.

In some alternative implementations, the third coordinate X' is $X'=(x', y', z')^T=RX+T$.

R is a rotation matrix for transformation from the vehicle coordinate system of the driverless vehicle to the world coordinate system, $X=(x, y, z)^T$ is the first coordinate of each laser point in the first laser point cloud reflection value data, and T is a translation matrix for transformation from the vehicle coordinate system of the driverless vehicle to the world coordinate system.

In some alternative implementations, the laser point cloud projection data comprises projection coordinates of the laser points in the first laser point cloud reflection value data, an average of laser reflection intensity values of laser points in projection grids, a variance of the laser reflection intensity values of the laser points in the projection grids, and the number of the laser points in the projection grids.

The projection coordinate X" of each laser point in the first laser point cloud reflection value data meets: $X''=(x'', y'')^T=SX'$.

S is a projection matrix, and meets:

$$S = \begin{bmatrix} 1 & 0 & 0 \\ 0 & 1 & 0 \end{bmatrix};$$

and each of the projection grids has a size and a shape identical to a size and a shape of the map grid.

In some alternative implementations, the matching probability determination module 530 may be further configured to: overlap a center projection grid O(x, y) of the laser point cloud projection data with a map grid corresponding to the prior positioning position $O'(x_o, y_o)$ in the laser point cloud reflection value map, wherein the center projection grid O(x, y) is a projection grid representing a vehicle body of the driverless vehicle in the laser point cloud projection data; determine a first matching probability between a projection range of the laser point cloud projection data and a corresponding map range; and moving the center projection grid O(x, y) by a predetermined offset k, and respectively determine first matching probabilities of the laser point cloud projection data corresponding to a current center projection grid O(x, y).

The position determination module 540 may be further configured to determine a position of the driverless vehicle in the laser point cloud reflection value map based on a weighted average of the first matching probabilities.

In some alternative implementations, the first matching probability P(x, y) corresponding to any center projection grid O(x, y) is:

$$P(x, y) = \alpha \frac{\sum_{x_i=x_1}^{x_m} \sum_{y_j=y_1}^{y_n} \frac{|\mu_{x_i,y_j}^m - \mu_{x_i,y_j}^r|(\sigma_{x_i,y_j}^m + \sigma_{x_i,y_j}^r) N_{x_i,y_j}^r}{2\sigma_{x_i,y_j}^m \sigma_{x_i,y_j}^r}}{\sum_{x_i=x_1}^{x_m} \sum_{y_j=y_1}^{y_n} N_{x_i,y_j}^r};$$

wherein, (x, y) is a world coordinate of the center projection grid, $(x_i, y_j)$ is a world coordinate of each projection grid in the projection range of the laser point cloud projection data, a is a preset constant parameter, $\mu_{x_i,y_j}^m$ is an average of laser reflection intensity values of laser points in the map grid whose world coordinate is $(x_i, y_j)$, $\mu_{x_i,y_j}^r$ is an average of laser reflection intensity values of laser points in the projection grid whose world coordinate is $(x_i, y_j)$, $\sigma_{x_i,y_j}^m$ is a variance of laser reflection intensity values of laser points in the map grid whose world coordinate is $(x_i, y_j)$, $\sigma_{x_i,y_j}^r$ is a variance of laser reflection intensity values of laser points in the projection grid whose world coordinate is $(x_i, y_j)$, and $N_{x_i,y_j}^r$ is the number of laser points in the projection grid whose world coordinate is $(x_i, y_j)$.

In some alternative implementations, the matching probability determination module 530 may be further configured to: update the first matching probability based on the previous positioning position, and the updated first matching probability P'(x, y) is:

$$P'(x,y) = \eta P(x,y) \overline{P}(x,y);$$

wherein, $\overline{P}(x, y)$ is a prediction probability of the driverless vehicle currently presenting at the position of the world coordinate (x, y) based on the previous positioning position, and η is a preset normalization coefficient.

In some alternative implementations, the position $(\overline{x}, \overline{y})$ of the driverless vehicle in the laser point cloud reflection value map determined by the position determination module 540 may be:

$$\begin{cases} \overline{x} = \frac{\sum_{i=-k}^{k} \sum_{j=-k}^{k} P'(x_0+i, y_0+j)^\alpha \cdot (x_0+i)}{\sum_{i=-k}^{k} \sum_{j=-k}^{k} P'(x_0+i, y_0+j)^\alpha} \\ \overline{y} = \frac{\sum_{i=-k}^{k} \sum_{j=-k}^{k} P'(x_0+i, y_0+j)^\alpha \cdot (y_0+j)}{\sum_{i=-k}^{k} \sum_{j=-k}^{k} P'(x_0+i, y_0+j)^\alpha} \end{cases},$$

wherein $(x_0, y_0)$ is a world coordinate of a map grid where the prior positioning position is located.

In some other alternative implementations, the position determination module 540 may be further configured to:

further divide the map grids in the predetermined range, so that each of the map grids is formed into p×q sub-grids;

the position $(\overline{x}, \overline{y})$ of the driverless vehicle in the laser point cloud reflection value map is:

$$\begin{cases} \overline{x} = \frac{\sum_{x=x_o-k}^{x_o+k} \sum_{y=y_o-k}^{y_o+k} \eta(x) P''(x, y)^\alpha \cdot x}{\sum_{x=x_o-k}^{x_o+k} \sum_{y=y_o-k}^{y_o+k} \eta(x) P''(x, y)^\alpha} \\ \overline{y} = \frac{\sum_{x=x_o-k}^{x_o+k} \sum_{y=y_o-k}^{y_o+k} \eta(y) P''(x, y)^\alpha \cdot y}{\sum_{x=x_o-k}^{x_o+k} \sum_{y=y_o-k}^{y_o+k} \eta(y) P''(x, y)^\alpha} \end{cases};$$

wherein:

$(x_0, y_0)$ is a world coordinate of a map grid where the prior positioning position is located, a step length of x variable in the range $[x_o-k, x_o+k]$ is $$\frac{1}{p},$$

and a step length of y variable in the range $[y_o-k, y_o+k]$ is $$\frac{1}{q};$$

$$\begin{cases} \eta(x) = \frac{1}{(x-x_o)^\beta} \\ \eta(y) = \frac{1}{(y-y_o)^\beta} \end{cases};$$

and

β is a preset constant parameter, and P''(x, y) is a probability obtained by conducting bilinear interpolation on the first matching probability when the map grid where (x, y) is located is used as the center projection grid.

The skilled in the art may understand that the apparatus 500 for positioning a driverless vehicle based on laser point cloud reflection value matching further comprises some other well-known structures, such as a processor and a memory, and these well-known structures are not shown in FIG. 5 to avoid unnecessarily obscuring the embodiment of the present disclosure.

Figure 6:
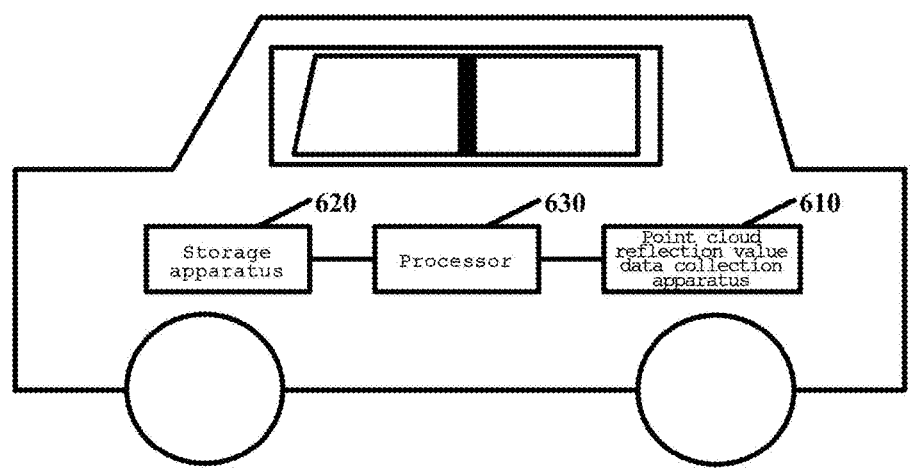
FIG. 6 is a schematic structural diagram of an embodiment of a driverless vehicle according to the present application.

Referring to FIG. 6, a schematic structural diagram 600 of an embodiment of a driverless vehicle according to some embodiments of the present application is shown.

As shown in FIG. 6, the driverless vehicle may comprise a point cloud reflection value data collection apparatus 610, a storage apparatus 620 and a processor 630.

The point cloud reflection value data collection apparatus 610 may be configured to collect laser point cloud reflection value data of a current position of the driverless vehicle, wherein, the laser point cloud reflection value data comprises coordinates of laser points and laser reflection intensity values corresponding to the laser points.

The storage apparatus 620 may be configured to store a laser point cloud reflection value map.

The processor 630 may be configured to project the laser point cloud reflection value data to the horizontal earth plane to generate laser point cloud projection data, determine a first matching probability of the laser point cloud projection data in a predetermined range of the laser point cloud reflection value map by using a position of a predetermined prior positioning position in the laser point cloud reflection value map as an initial position, and determine a positioning of the driverless vehicle in the laser point cloud reflection value map based on the first matching probability.

In some alternative implementations, the laser point cloud reflection value map may comprise dividing the Earth surface into M×N map areas in the horizontal earth plane of the world coordinate system, the map areas having identical sizes and shapes. Each of the map areas may further comprise m×n map grids, wherein the map grids have identical sizes and shapes. The laser point cloud reflection value map may further comprise an average of laser reflection intensity values of laser points corresponding to a positioning position of the map grid, a variance of the laser reflection intensity values of the laser points corresponding to the positioning position of the map grid, and the number of the laser points corresponding to the positioning position of the map grid.

In some alternative implementations, the first coordinate of each of the laser points may be a coordinate of each laser point in the first laser point cloud reflection value data in a vehicle coordinate system of the driverless vehicle.

The conversion module 630 may be further configured to convert the first laser point cloud reflection value data into third laser point cloud reflection value data, project the third laser point cloud reflection value data to the horizontal earth plane, to generate laser point cloud projection data. The third laser point cloud reflection value data comprises third coordinates of laser points and laser reflection intensity values corresponding to the laser points in the first laser point cloud reflection value data, wherein the third coordinate is a coordinate of a laser point in the first laser point cloud reflection value data in the world coordinate system.

In some alternative implementations, the third coordinate X' is $X'=(x', y', z')^T=RX+T$.

R is a rotation matrix for transformation from the vehicle coordinate system of the driverless vehicle to the world coordinate system, $X=(x, y, z)^T$ is the first coordinate of each laser point in the first laser point cloud reflection value data, and T is a translation matrix for transformation from the vehicle coordinate system of the driverless vehicle to the world coordinate system.

In some alternative implementations, the laser point cloud projection data comprises projection coordinates of the laser points in the first laser point cloud reflection value data, an average of laser reflection intensity values of laser points in projection grids, a variance of the laser reflection intensity values of the laser points in the projection grids, and the number of the laser points in the projection grids.

The projection coordinate X" of each laser point in the first laser point cloud reflection value data meets: $X''=(x'', y'')^T=SX'$.

S is a projection matrix, and meets:

$$S = \begin{bmatrix} 1 & 0 & 0 \\ 0 & 1 & 0 \end{bmatrix};$$

and each of the projection grids has a size and a shape identical to a size and a shape of the map grid.

In some alternative implementations, the processor 630 may be further configured to: overlap a center projection grid O(x, y) of the laser point cloud projection data with a map grid corresponding to the prior positioning position O'($x_o$, $y_o$) in the laser point cloud reflection value map, wherein the center projection grid O(x, y) is a projection grid representing a vehicle body of the driverless vehicle in the laser point cloud projection data; determine a first matching probability between a projection range of the laser point cloud projection data and a corresponding map range; and moving the center projection grid O(x, y) by a preset offset k, and respectively determine first matching probabilities of the laser point cloud projection data corresponding to a current center projection grid O(x, y).

The processor 630 may be further configured to determine a position of the driverless vehicle in the laser point cloud reflection value map based on a weighted average of the first matching probabilities.

In some alternative implementations, the first matching probability P(x, y) corresponding to any center projection grid O(x, y) is:

$$P(x, y) = \alpha \frac{\sum_{x_i=x_1}^{x_m} \sum_{y_j=y_1}^{y_n} \frac{|\mu_{x_i,y_j}^m - \mu_{x_i,y_j}^r|(\sigma_{x_i,y_j}^m + \sigma_{x_i,y_j}^r) N_{x_i,y_j}^r}{2\sigma_{x_i,y_j}^m \sigma_{x_i,y_j}^r}}{\sum_{x_i=x_1}^{x_m} \sum_{y_j=y_1}^{y_n} N_{x_i,y_j}^r};$$

wherein, (x, y) is a world coordinate of the center projection grid, ($x_i$, $y_j$) is a world coordinate of each projection grid in the projection range of the laser point cloud projection data, $\alpha$ is a preset constant parameter, $\mu_{x_i,y_j}^m$ is an average of laser reflection intensity values of laser points in the map grid whose world coordinate is ($x_i$, $y_j$), $\mu_{x_i,y_j}^r$ is an average of laser reflection intensity values of laser points in the projection grid whose world coordinate is ($x_i$, $y_j$), $\sigma_{x_i,y_j}^m$ is a variance of laser reflection intensity values of laser points in the map grid whose world coordinate is ($x_i$, $y_j$), $\sigma_{x_i,y_j}^r$ is a variance of laser reflection intensity values of laser points in the projection grid whose world coordinate is ($x_i$, $y_i$), and $N\mu_{x_i,y_j}^r$ is the number of laser points in the projection grid whose world coordinate is ($x_i$, $y_j$).

In some alternative implementations, the processor 630 may be further configured to: update the first matching probability based on the previous positioning position, and the updated first matching probability P'(x, y) is:

$$P'(x,y)=\eta P(x,y)\overline{P}(x,y);$$

wherein, $\overline{P}$ (x, y) is a prediction probability of the driverless vehicle currently presenting at the position of the world coordinate (x, y) based on the previous positioning position, and $\eta$ is a preset normalization coefficient.

In some alternative implementations, the position ($\bar{x},\bar{y}$) of the driverless vehicle in the laser point cloud reflection value map determined by the processor 630 may be:

$$\begin{cases} \bar{x} = \dfrac{\sum_{i=-k}^{k} \sum_{j=-k}^{k} P'(x_0+i, y_0+j)^\alpha \cdot (x_0+i)}{\sum_{i=-k}^{k} \sum_{j=-k}^{k} P'(x_0+i, y_0+j)^\alpha} \\ \bar{y} = \dfrac{\sum_{i=-k}^{k} \sum_{j=-k}^{k} P'(x_0+i, y_0+j)^\alpha \cdot (y_0+j)}{\sum_{i=-k}^{k} \sum_{j=-k}^{k} P'(x_0+i, y_0+j)^\alpha} \end{cases},$$

wherein ($x_0$, $y_0$) is a world coordinate of a map grid where the prior positioning position is located.

In some other alternative implementations, the processor 630 may be further configured to:
further divide the map grids in the predetermined range, so that each of the map grids is formed into p×q sub-grids;
the position $(\bar{x},\bar{y})$ of the driverless vehicle in the laser point cloud reflection value map is:

$$\begin{cases} \bar{x} = \dfrac{\sum\limits_{x=x_o-k}^{x_o+k}\sum\limits_{y=y_o-k}^{y_o+k} \eta(x)P''(x,y)^\alpha \cdot x}{\sum\limits_{x=x_o-k}^{x_o+k}\sum\limits_{y=y_o-k}^{y_o+k} \eta(x)P''(x,y)^\alpha} \\ \bar{y} = \dfrac{\sum\limits_{x=x_o-k}^{x_o+k}\sum\limits_{y=y_o-k}^{y_o+k} \eta(y)P''(x,y)^\alpha \cdot y}{\sum\limits_{x=x_o-k}^{x_o+k}\sum\limits_{y=y_o-k}^{y_o+k} \eta(y)P''(x,y)^\alpha} \end{cases};$$

wherein:
$(x_0, y_0)$ is a world coordinate of a map grid where the prior positioning position is located, a step length of x variable in the range $[x_o-k, x_o+k]$ is $$\frac{1}{p},$$

and a step length of y variable in the range $[y_o-k, y_o+k]$ is $$\frac{1}{q};$$

$$\begin{cases} \eta(x) = \dfrac{1}{(x-x_o)^\beta} \\ \eta(y) = \dfrac{1}{(y-y_o)^\beta} \end{cases};$$

and
β is a preset constant parameter, and P''(x, y) is a probability obtained by conducting bilinear interpolation on the first matching probability when the map grid where (x, y) is located is used as the center projection grid.

Figure 7:
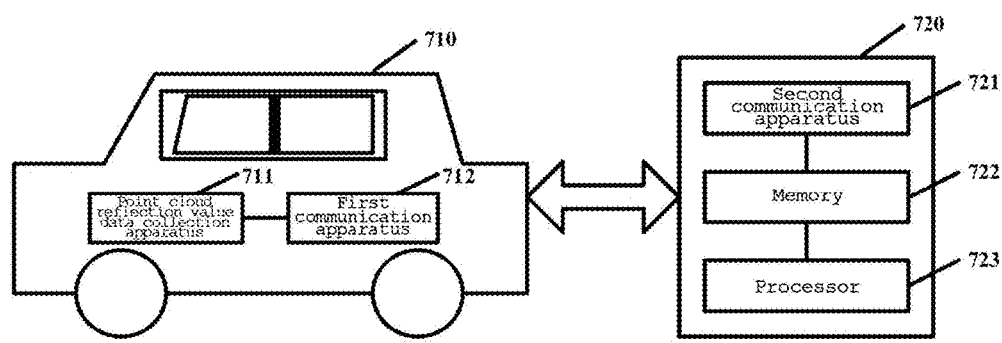
FIG. 7 is a schematic structural diagram of an embodiment of a system for positioning a driverless vehicle according to the present application.
Figure 8:
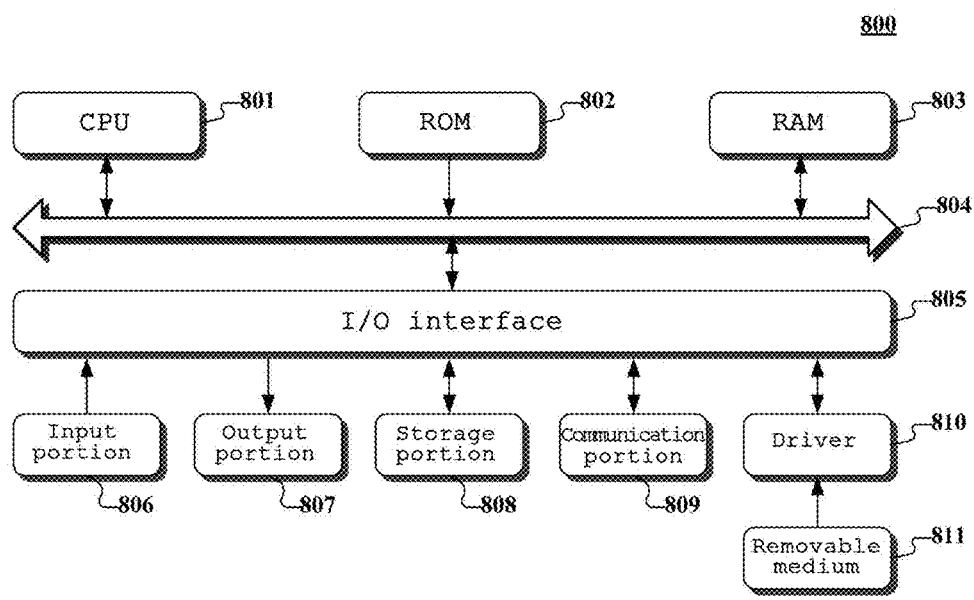
FIG. 8 illustrates a structural schematic diagram of a computer system adapted to implement a processor or a positioning server of a driverless vehicle of the embodiment of the present application.

Referring to FIG. 7, a schematic structural diagram 700 of an embodiment of a system for positioning a driverless vehicle according to some embodiments of the present application is shown.

The system for positioning a driverless vehicle in this embodiment may comprise a driverless vehicle 710 and a positioning server 720.

The driverless vehicle 710 may comprise a point cloud reflection value data collection apparatus 711 and a first communication apparatus 712.

The point cloud reflection value data collection apparatus 711 may be configured to collect laser point cloud reflection value data of a current position of the driverless vehicle, wherein, the laser point cloud reflection value data comprises first coordinates of laser points and laser reflection intensity values corresponding to the laser points. The first communication apparatus 712 may be configured to send the laser point cloud reflection value data to the positioning server.

The positioning server 720 may comprise a second communication apparatus 721, a memory 722, and a processor 723.

The second communication apparatus 721 may be configured to receive the laser point cloud reflection value data sent by the first communication apparatus 711. The memory 722 may be configured to store a laser point cloud reflection value map.

The processor 723 may be configured to project the laser point cloud reflection value data to the horizontal earth plane to generate laser point cloud projection data, determine a first matching probability of the laser point cloud projection data in a predetermined area of the laser point cloud reflection value map by using a position of a predetermined prior positioning position in the laser point cloud reflection value map as an initial position, and determine a positioning result of the driverless vehicle based on the first matching probability. The positioning result comprises position information of the driverless vehicle in the laser point cloud reflection value map.

Moreover, the second communication apparatus 721 is further configured to send the positioning result to the first communication apparatus 711.

In some alternative implementations, the laser point cloud reflection value map may comprise dividing the Earth surface into M×N map areas in the horizontal earth plane of the world coordinate system, wherein the map areas have identical sizes and shapes. Each of the map areas may further comprise m×n map grids, wherein the map grids have identical sizes and shapes. The laser point cloud reflection value map further comprises an average of laser reflection intensity values of laser points corresponding to a positioning position of the map grid, a variance of the laser reflection intensity values of the laser points corresponding to the positioning position of the map grid, and the number of the laser points corresponding to the positioning position of the map grid.

In some alternative implementations, the first coordinate of each of the laser points may be a coordinate of each laser point in the first laser point cloud reflection value data in a vehicle coordinate system of the driverless vehicle.

The conversion module 723 may be further configured to convert the first laser point cloud reflection value data into third laser point cloud reflection value data, project the third laser point cloud reflection value data to the horizontal earth plane, to generate laser point cloud projection data. The third laser point cloud reflection value data comprises third coordinates of laser points and laser reflection intensity values corresponding to the laser points in the first laser point cloud reflection value data, wherein the third coordinate is a coordinate of a laser point in the first laser point cloud reflection value data in the world coordinate system.

In some alternative implementations, the third coordinate X' is $X'=(x', y', z')^T=RX+T$.

R is a rotation matrix for transformation from the vehicle coordinate system of the driverless vehicle to the world coordinate system, $X=(x, y, z)^T$ is the first coordinate of each laser point in the first laser point cloud reflection value data, and T is a translation matrix for transformation from the vehicle coordinate system of the driverless vehicle to the world coordinate system.

In some alternative implementations, the laser point cloud projection data comprises projection coordinates of the laser points in the first laser point cloud reflection value data, an average of laser reflection intensity values of laser points in projection grids, a variance of the laser reflection intensity values of the laser points in the projection grids, and the number of the laser points in the projection grids. The projection coordinate X" of each laser point in the first laser point cloud reflection value data meets: $X''=(x'', y'')^T=SX'$.

S is a projection matrix, and meets:

$$S = \begin{bmatrix} 1 & 0 & 0 \\ 0 & 1 & 0 \end{bmatrix};$$

and each of the projection grids has a size and a shape identical to a size and a shape of the map grid.

In some alternative implementations, the processor 723 may be further configured to: overlap a center projection grid $O(x, y)$ of the laser point cloud projection data with a map grid corresponding to the prior positioning position $O'(x_o, y_o)$ in the laser point cloud reflection value map, wherein the center projection grid $O(x, y)$ is a projection grid representing a vehicle body of the driverless vehicle in the laser point cloud projection data; determine a first matching probability between a projection range of the laser point cloud projection data and a corresponding map range; and moving the center projection grid $O(x, y)$ by the predetermined offset k, and respectively determine first matching probabilities of the laser point cloud projection data corresponding to a current center projection grid $O(x, y)$.

The processor 723 may be further configured to determine a position of the driverless vehicle in the laser point cloud reflection value map based on a weighted average of the first matching probabilities.

In some alternative implementations, the first matching probability $P(x, y)$ corresponding to any center projection grid $O(x, y)$ is:

$$P(x, y) = \alpha \frac{\sum_{x_i=x_1}^{x_m} \sum_{y_j=y_1}^{y_n} \frac{|\mu_{x_i,y_j}^m - \mu_{x_i,y_j}^r|(\sigma_{x_i,y_j}^m + \sigma_{x_i,y_j}^r) N_{x_i,y_j}^r}{2\sigma_{x_i,y_j}^m \sigma_{x_i,y_j}^r}}{\sum_{x_i=x_1}^{x_m} \sum_{y_j=y_1}^{y_n} N_{x_i,y_j}^r};$$

wherein, $(x, y)$ is a world coordinate of the center projection grid, $(x_i, y_j)$ is a world coordinate of each projection grid in the projection range of the laser point cloud projection data, $\alpha$ is a preset constant parameter, $\mu_{x_i,y_j}^m$ is an average of laser reflection intensity values of laser points in the map grid whose world coordinate is $(x_i, y_j)$, $\mu_{x_i,y_j}^r$ is an average of laser reflection intensity values of laser points in the projection grid whose world coordinate is $(x_i, y_j)$, $\sigma_{x_i,y_j}^m$ is a variance of laser reflection intensity values of laser points in the map grid whose world coordinate is $(x_i, y_j)$, $\sigma_{x_i,y_j}^r$ is a variance of laser reflection intensity values of laser points in the projection grid whose world coordinate is $(x_i, y_j)$, and $N_{x_i,y_j}^r$ is the number of laser points in the projection grid whose world coordinate is $(x_i, y_j)$.

In some alternative implementations, the processor 723 may be further configured to: update the first matching probability based on the previous positioning position, and the updated first matching probability $P'(x, y)$ is:

$$P'(x,y) = \eta P(x,y) \overline{P}(x,y);$$

wherein, $\overline{P}(x, y)$ is a prediction probability of the driverless vehicle currently presenting at the position of the world coordinate $(x, y)$ based on the previous positioning position, and $\eta$ is a preset normalization coefficient.

In some alternative implementations, the position $(\overline{x}, \overline{y})$ of the driverless vehicle in the laser point cloud reflection value map determined by the processor 723 may be:

$$\begin{cases} \overline{x} = \dfrac{\sum_{i=-k}^{k} \sum_{j=-k}^{k} P'(x_0+i, y_0+j)^\alpha \cdot (x+i)}{\sum_{i=-k}^{k} \sum_{j=-k}^{k} P'(x_0+i, y_0+j)^\alpha} \\ \overline{y} = \dfrac{\sum_{i=-k}^{k} \sum_{j=-k}^{k} P'(x_0+i, y_0+j)^\alpha \cdot (y_0+j)}{\sum_{i=-k}^{k} \sum_{j=-k}^{k} P'(x_0+i, y_0+j)^\alpha} \end{cases},$$

wherein $(x_0, y_0)$ is a world coordinate of a map grid where the prior positioning position is located.

In some other alternative implementations, the processor 723 may be further configured to:

further divide the map grids in the predetermined range, so that each of the map grids is formed into p×q sub-grids;

the position $(\overline{x}, \overline{y})$ of the driverless vehicle in the laser point cloud reflection value map is:

$$\begin{cases} \overline{x} = \dfrac{\sum_{x=x_o-k}^{x_o+k} \sum_{y=y_o-k}^{y_o+k} \eta(x) P''(x, y)^\alpha \cdot x}{\sum_{x=x_o-k}^{x_o+k} \sum_{y=y_o-k}^{y_o+k} \eta(x) P''(x, y)^\alpha} \\ \overline{y} = \dfrac{\sum_{x=x_o-k}^{x_o+k} \sum_{y=y_o-k}^{y_o+k} \eta(y) P''(x, y)^\alpha \cdot y}{\sum_{x=x_o-k}^{x_o+k} \sum_{y=y_o-k}^{y_o+k} \eta(x) P''(x, y)^\alpha} \end{cases};$$

wherein:

$(x_0, y_0)$ is a world coordinate of a map grid where the prior positioning position is located, a step length of x variable in the range $[x_o-k, x_o+k]$ is $$\frac{1}{p},$$

and a step length of y variable in the range $[y_o-k, y_o+k]$ is $$\frac{1}{q};$$

$$\begin{cases} \eta(x) = \dfrac{1}{(x-x_o)^\beta} \\ \eta(y) = \dfrac{1}{(y-y_o)^\beta} \end{cases};$$

and $\beta$ is a preset constant parameter, and $P''(x, y)$ is a probability obtained by conducting bilinear interpolation on the first matching probability when the map grid where $(x, y)$ is located is used as the center projection grid.

Referring to FIG. 6, a schematic structural diagram of a computer system 600 adapted to implement a server of the embodiments of the present application is shown.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to an embodiment of the present disclosure, the process described above with reference to the flowcharts may be implemented in a computer software program. For example, an embodiment of the present disclosure includes a computer program product, which comprises a computer program that is tangibly embedded in a machine-readable medium. The computer program comprises program codes for executing the method of the flowcharts. In such an embodiment, the computer program may be downloaded and installed from a network via the communication portion 609, and/or may be installed from the removable media 611.

The flowcharts and block diagrams in the figures illustrate architectures, functions and operations that may be implemented according to the system, the method and the computer program product of the various embodiments of the present disclosure. In this regard, each block in the flowcharts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present application may be implemented by way of software or hardware. The described units or modules may also be provided in a processor, for example, described as: a processor, comprising a receiving unit, a determination unit, a segment reading unit, a row reading unit and a sending unit.

For example, the acquisition module may also be described as "a module for acquiring first laser point cloud reflection value data matching a current position of a driverless vehicle.

In another aspect, some embodiments of the present application further provide a computer readable storage medium. The computer readable storage medium may be the computer readable storage medium included in the apparatus in the above embodiments, or a stand-alone computer readable storage medium which has not been assembled into the apparatus. The computer readable storage medium stores one or more programs. When the one or more programs are executed by a device, the device is used for: acquiring first laser point cloud reflection value data matching a current position of the driverless vehicle, the first laser point cloud reflection value data comprising first coordinates of laser points and laser reflection intensity values corresponding to the laser points in the first laser point cloud reflection value data; converting the first laser point cloud reflection value data into laser point cloud projection data in a horizontal earth plane; determining a first matching probability of the laser point cloud projection data in a predetermined range of a laser point cloud reflection value map by using a position of a predetermined prior positioning position in the laser point cloud reflection value map as an initial position; and determining a position of the driverless vehicle in the laser point cloud reflection value map based on the first matching probability.

The foregoing is a description of some embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the disclosure, such as, technical solutions formed by replacing the features as disclosed in the present application with (but not limited to), technical features with similar functions.

What is claimed is:

1. A method for positioning a driverless vehicle based on laser point cloud reflection value matching, comprising:
   acquiring first laser point cloud reflection value data matching a current position of the driverless vehicle by using a laser point cloud reflection value collection apparatus disposed on the driverless vehicle to collect the first laser point cloud reflection value data, the first laser point cloud reflection value data comprising first coordinates of laser points and laser reflection intensity values corresponding to the laser points in the first laser point cloud reflection value data; and
   transmitting the first laser point cloud reflection value data to a positioning server via a first communication apparatus disposed on the driverless vehicle, the positioning server comprising a second communication apparatus and a processor configured to perform the steps of:
   projecting the first laser point cloud reflection value data to a horizontal earth plane to generate laser point cloud projection data;
   determining a first matching probability of the laser point cloud projection data in a predetermined range of a laser point cloud reflection value map by using a position of a predetermined prior positioning position in the laser point cloud reflection value map as an initial position;

determining a position of the driverless vehicle in the laser point cloud reflection value map based on the first matching probability; and transmitting the position of the driverless vehicle to the first communication apparatus via the second communication apparatus.

2. The method according to claim 1, wherein the laser point cloud reflection value map is generated by:

dividing the Earth surface into M×N map areas in the horizontal earth plane of a world coordinate system, the map areas having identical sizes and shapes;

dividing each of the map areas further into m×n map grids, the map grids having identical sizes and shapes;

collecting second laser point cloud reflection value data corresponding to positioning positions of each of the map grids, the second laser point cloud reflection value data comprising second coordinates of laser points in the world coordinate system and laser reflection intensity values corresponding to the laser points in the second laser point cloud reflection value data; and storing corresponding map data in each of the map grids, wherein the map data comprises an average of laser reflection intensity values of laser points in the positioning position corresponding to the map grid, a variance of the laser reflection intensity values of the laser points in the positioning position corresponding to the map grid, and the number of the laser points in the positioning position corresponding to the map grid.

3. The method according to claim 2, wherein the first coordinate of each of the laser points is a coordinate of each laser point in the first laser point cloud reflection value data in a vehicle coordinate system of the driverless vehicle;

the converting the first laser point cloud reflection value data into laser point cloud projection data in the horizontal earth plane comprises:

converting the first laser point cloud reflection value data into third laser point cloud reflection value data, wherein the third laser point cloud reflection value data comprises third coordinates of laser points and laser reflection intensity values corresponding to the laser points in the first laser point cloud reflection value data, and wherein the third coordinate is a coordinate of each laser point in the first laser point cloud reflection value data in the world coordinate system; and projecting the third laser point cloud reflection value data to the horizontal earth plane to generate the laser point cloud projection data.

4. The method according to claim 3, wherein the third coordinate X' is:

$$X'=(x',y',z')^T=RX+T;$$

wherein, R is a rotation matrix for transformation from the vehicle coordinate system of the driverless vehicle to the world coordinate system, $X=(x, y, z)^T$ is the first coordinate of each laser point in the first laser point cloud reflection value data, and T is a translation matrix for transformation from the vehicle coordinate system of the driverless vehicle to the world coordinate system.

5. The method according to claim 4, wherein:

the laser point cloud projection data comprises projection coordinates of the laser points in the first laser point cloud reflection value data, an average of laser reflection intensity values of laser points in projection grids, a variance of the laser reflection intensity values of the laser points in the projection grids, and the number of the laser points in the projection grids;

wherein, the projection coordinate X" of each laser point in the first laser point cloud reflection value data meets:

$$X''(x'',y'')^T=SX';$$

S is a projection matrix, and meets:

$$S = \begin{bmatrix} 1 & 0 & 0 \\ 0 & 1 & 0 \end{bmatrix};$$

and each of the projection grids has a size and a shape identical to a size and a shape of the map grid.

6. The method according to claim 5, wherein:

the determining a first matching probability of the laser point cloud projection data in a predetermined range of a laser point cloud reflection value map by using a position of a predetermined prior positioning position in the laser point cloud reflection value map as an initial position comprises:

overlapping a center projection grid O(x, y) of the laser point cloud projection data with a map grid corresponding to the prior positioning position O'(x$_o$, y$_o$) in the laser point cloud reflection value map, wherein the center projection grid O(x, y) is a projection grid representing a vehicle body of the driverless vehicle in the laser point cloud projection data;

determining a first matching probability between a projection range of the laser point cloud projection data and a corresponding map range;

moving the center projection grid O(x, y) by a predetermined offset k, and respectively determining first matching probabilities of the laser point cloud projection data corresponding to a current center projection grid O(x, y); and the determining a position of the driverless vehicle in the laser point cloud reflection value map based on the first matching probability comprises:

determining a position of the driverless vehicle in the laser point cloud reflection value map based on a weighted average of the first matching probabilities.

7. The method according to claim 6, wherein:

the first matching probability P(x, y) corresponding to any center projection grid O(x, y) is:

$$P(x, y) = \alpha \frac{\sum_{x_i=x_1}^{x_m} \sum_{y_j=y_1}^{y_n} \frac{|\mu_{x_i,y_j}^m - \mu_{x_i,y_j}^r|(\sigma_{x_i,y_j}^m + \sigma_{x_i,y_j}^r) N_{x_i,y_j}^r}{2\sigma_{x_i,y_j}^m \sigma_{x_i,y_j}^r}}{\sum_{x_i=x_1}^{x_m} \sum_{y_j=y_1}^{y_n} N_{x_i,y_j}^r};$$

wherein, (x, y) is a world coordinate of the center projection grid, (x$_i$, y$_j$) is a world coordinate of each projection grid in the projection range of the laser point cloud projection data, α is a preset constant parameter, $\mu_{x_i,y_j}^m$ is an average of laser reflection intensity values of laser points in the map grid whose world coordinate is (x$_i$, y$_j$), $\mu_{x_i,y_j}^r$ is an average of laser reflection intensity values of laser points in the projection grid whose world coordinate is (x$_i$, y$_j$), $\sigma_{x_i,y_j}^m$ is a variance of laser reflection intensity values of laser points in the map grid whose world coordinate is (x$_i$, y$_j$), $\sigma_{x_i,y_j}^r$ is a variance of laser reflection intensity values of laser points in the projection grid whose world coordinate is (x$_i$, y$_j$), and $N_{x_i,y_j}^r$ is the number of laser points in the projection grid whose world coordinate is (x$_i$, y$_j$).

8. The method according to claim 7, wherein the determining a first matching probability of the laser point cloud projection data in a predetermined range of a laser point cloud reflection value map by using a position of a predetermined prior positioning position in the laser point cloud reflection value map as an initial position further comprises:

updating the first matching probability based on a previous positioning position, the updated first matching probability P'(x, y) being:

P'(x,y)=ηP(x,y)$\overline{P}$(x,y);

wherein, $\overline{P}$(x, y) is a prediction probability of the driverless vehicle currently presenting at the position of the world coordinate (x, y) based on the previous positioning position, and η is a preset normalization coefficient.

9. The method according to claim 8, wherein the position ($\overline{x}$, $\overline{y}$) of the driverless vehicle in the laser point cloud reflection value map is:

$$\begin{cases} \overline{x} = \dfrac{\sum_{i=-k}^{k}\sum_{j=-k}^{k} P'(x_0+i, y_0+j)^\alpha \cdot (x+i)}{\sum_{i=-k}^{k}\sum_{j=-k}^{k} P'(x_0+i, y_0+j)^\alpha} \\ \overline{y} = \dfrac{\sum_{i=-k}^{k}\sum_{j=-k}^{k} P'(x_0+i, y_0+j)^\alpha \cdot (y_0+j)}{\sum_{i=-k}^{k}\sum_{j=-k}^{k} P'(x_0+i, y_0+j)^\alpha} \end{cases};$$

wherein ($x_0$, $y_0$) is a world coordinate of a map grid where the prior positioning position is located.

10. The method according to claim 8, wherein the determining the position of the driverless vehicle in the laser point cloud reflection value map based on the first matching probability comprises:

further dividing the map grids in the predetermined range, so that each of the map grids is formed into p×q sub-grids;

the position ($\overline{x}$, $\overline{y}$) of the driverless vehicle in the laser point cloud reflection value map is:

$$\begin{cases} \overline{x} = \dfrac{\sum_{x=x_o-k}^{x_o+k}\sum_{y=y_o-k}^{y_o+k} \eta(x) P''(x,y)^\alpha \cdot x}{\sum_{x=x_o-k}^{x_o+k}\sum_{y=y_o-k}^{y_o+k} \eta(x) P''(x,y)^\alpha} \\ \overline{y} = \dfrac{\sum_{x=x_o-k}^{x_o+k}\sum_{y=y_o-k}^{y_o+k} \eta(y) P''(x,y)^\alpha \cdot y}{\sum_{x=x_o-k}^{x_o+k}\sum_{y=y_o-k}^{y_o+k} \eta(x) P''(x,y)^\alpha} \end{cases};$$

wherein:

($x_0$, $y_0$) is a world coordinate of a map grid where the prior positioning position is located, a step length of x variable in the range [$x_o$−k, $x_o$+k] is $$\frac{1}{p},$$

and a step length of y variable in the range [$y_o$−k, $y_o$+k] is $$\frac{1}{q};$$

$$\begin{cases} \eta(x) = \dfrac{1}{(x-x_o)^\beta} \\ \eta(y) = \dfrac{1}{(y-y_o)^\beta} \end{cases};$$

and

β is a preset constant parameter, and P''(x, y) is a probability obtained by conducting bilinear interpolation on the first matching probability when the map grid where (x, y) is located is used as the center projection grid.

11. A system for positioning a driverless vehicle, comprising a driverless vehicle and a positioning server, wherein
the driverless vehicle comprises a point cloud reflection value data collection apparatus and a first communication apparatus;
the point cloud reflection value data collection apparatus is configured to collect laser point cloud reflection value data of a current position of the driverless vehicle, the laser point cloud reflection value data comprising first coordinates of laser points and laser reflection intensity values corresponding to the laser points;
the first communication apparatus is configured to send the laser point cloud reflection value data to the positioning server;
the positioning server comprises a second communication apparatus, a memory, and a processor;
the second communication apparatus is configured to receive the laser point cloud reflection value data sent by the first communication apparatus;
the memory is configured to store a laser point cloud reflection value map;
the processor is configured to project the laser point cloud reflection value data to a horizontal earth plane to generate laser point cloud projection data, determine a first matching probability of the laser point cloud projection data in a predetermined area of the laser point cloud reflection value map by using a position of a predetermined prior positioning position in the laser point cloud reflection value map as an initial position, and determine a positioning result of the driverless vehicle based on the first matching probability, the positioning result comprising position information of the driverless vehicle in the laser point cloud reflection value map; and
the second communication apparatus is further configured to send the positioning result to the first communication apparatus.

12. The system for positioning a driverless vehicle according to claim 11, wherein:
the laser point cloud reflection value map comprises dividing the Earth surface into M×N map areas in the horizontal earth plane of a world coordinate system, the map areas having identical sizes and shapes;
each of the map areas further comprises m×n map grids, the map grids having identical sizes and shapes; and the laser point cloud reflection value map further comprises an average of laser reflection intensity values of laser points corresponding to a positioning position of the map grid, a variance of the laser reflection intensity values of the laser points corresponding to the positioning position of the map grid, and the number of the laser points corresponding to the positioning position of the map grid.

13. A non-transitory computer storage medium storing one or more programs, the one or more programs when executed by a processor of an apparatus disposed on a driverless vehicle, causing the apparatus to perform operations, the operations comprising:

acquiring first laser point cloud reflection value data matching a current position of the driverless vehicle by using a laser point cloud reflection value collection apparatus disposed on the driverless vehicle to collect the first laser point cloud reflection value data, the first laser point cloud reflection value data comprising first coordinates of laser points and laser reflection intensity values corresponding to the laser points in the first laser point cloud reflection value data; and transmitting the first laser point cloud reflection value data to a positioning server via a first communication apparatus disposed on the driverless vehicle, the positioning server comprising a second communication apparatus and a processor configured to perform the steps of:

projecting the first laser point cloud reflection value data into laser point cloud projection data in a horizontal earth plane;

determining a first matching probability of the laser point cloud projection data in a predetermined range of a laser point cloud reflection value map by using a position of a predetermined prior positioning position in the laser point cloud reflection value map as an initial position;

determining a position of the driverless vehicle in the laser point cloud reflection value map based on the first matching probability; and transmitting the position of the driverless vehicle to the first communication apparatus via the second communication apparatus.

14. The non-transitory computer storage medium according to claim 13, wherein the laser point cloud reflection value map is generated by:

dividing the Earth surface into M×N map areas in the horizontal earth plane of a world coordinate system, the map areas having identical sizes and shapes;

dividing each of the map areas further into m×n map grids, the map grids having identical sizes and shapes;

collecting second laser point cloud reflection value data corresponding to positioning positions of each of the map grids, the second laser point cloud reflection value data comprising second coordinates of laser points in the world coordinate system and laser reflection intensity values corresponding to the laser points in the second laser point cloud reflection value data; and storing corresponding map data in each of the map grids, wherein the map data comprises an average of laser reflection intensity values of laser points in the positioning position corresponding to the map grid, a variance of the laser reflection intensity values of the laser points in the positioning position corresponding to the map grid, and the number of the laser points in the positioning position corresponding to the map grid.

* * * * *